Oct. 8, 1929.  H. O. SCRANTON  1,730,479
CONVEYER
Original Filed Oct. 12, 1926   2 Sheets-Sheet 1
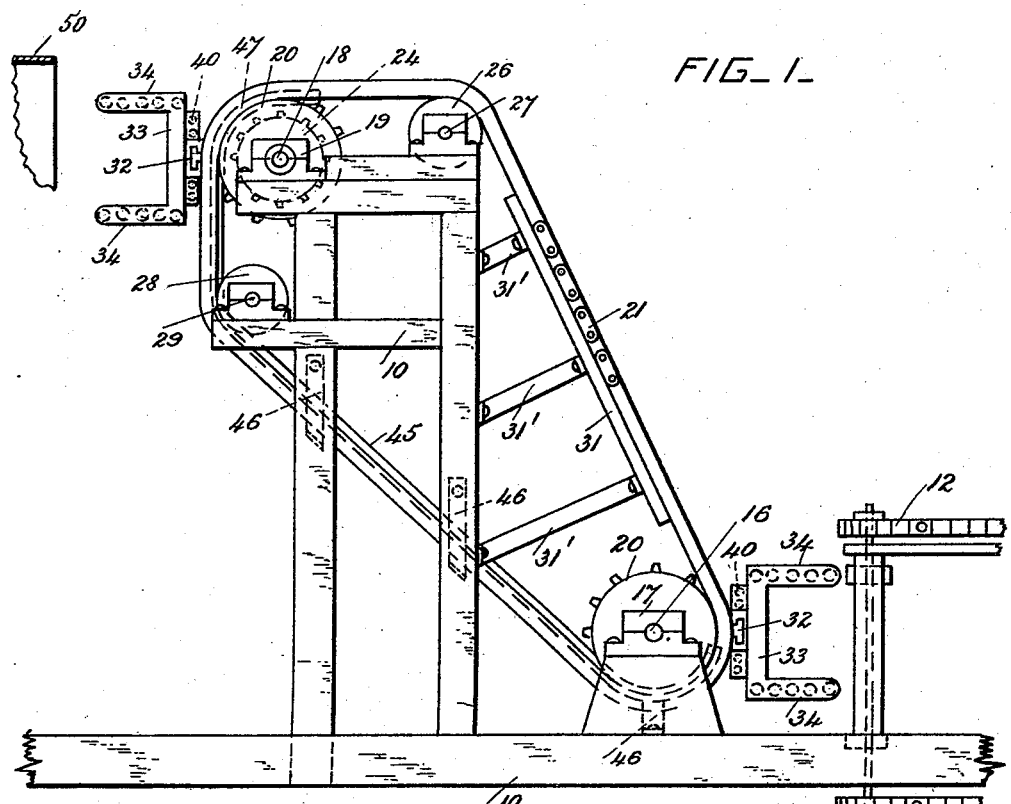
FIG_1_
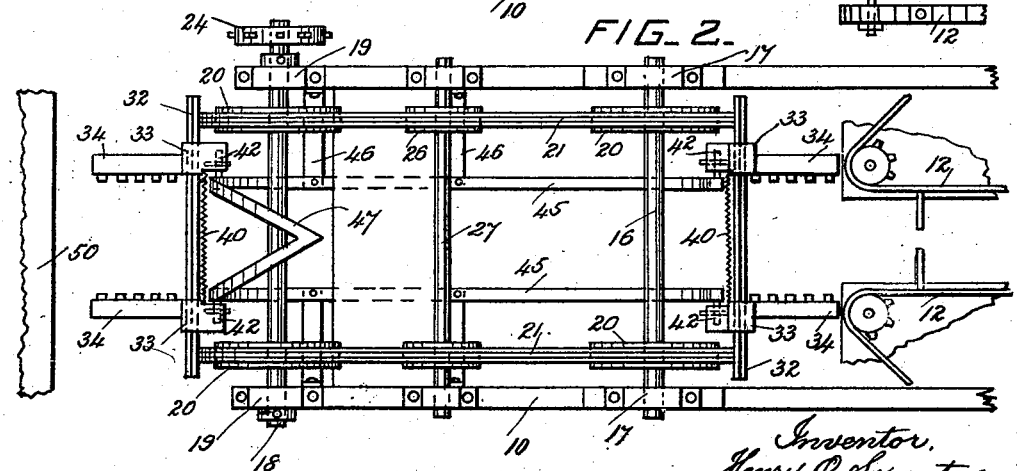
FIG_2_
Inventor,
Henry O. Scranton
by Herbert W. S. Jenner
Attorney.

Oct. 8, 1929.　　　H. O. SCRANTON　　　1,730,479
CONVEYER
Original Filed Oct. 12, 1926　　2 Sheets-Sheet 2
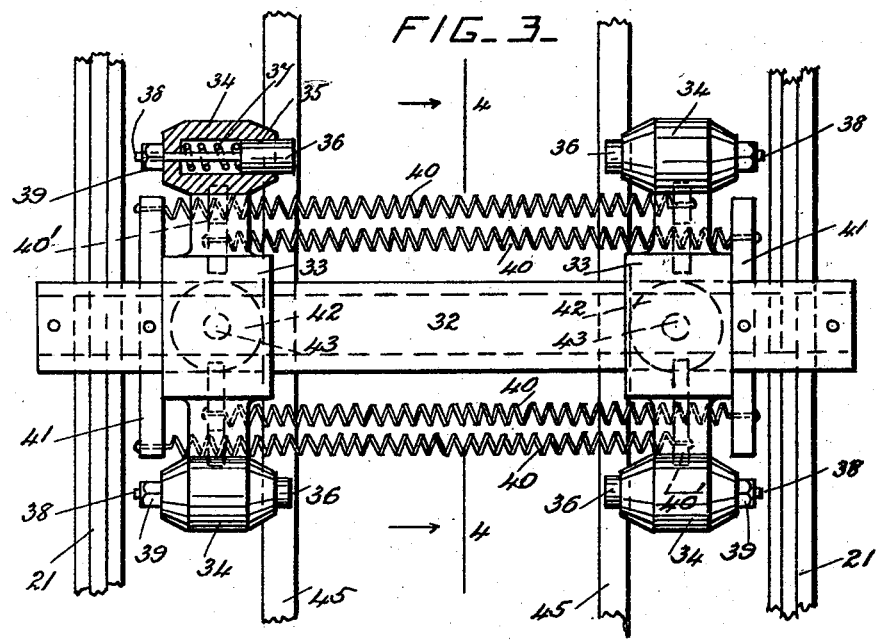
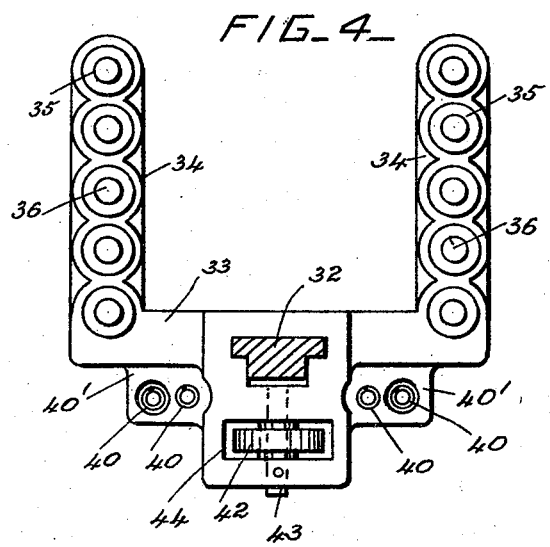
Inventor,
Henry O. Scranton
by Hubert W. Jenner,
Attorney.

Patented Oct. 8, 1929

1,730,479

UNITED STATES PATENT OFFICE

HENRY OSBERT SCRANTON, OF LAFAYETTE, LOUISIANA

CONVEYER

Original application filed October 12, 1926, Serial No. 141,085. Divided and this application filed January 21, 1928. Serial No. 248,465.

This application is a division of the application for transfer mechanism, filed by me on October 12, 1926, Serial Number 141,085, now Patent Number 1,677,601. This transfer mechanism is specially adapted for use in machines for harvesting sugar canes, and operates continuously, and is provided with a conveyer which grips the canes and moves them rearwardly in the machine.

This invention consists of a conveyer constructed as hereinafter fully described and claimed.

In the drawings, Fig. 1 is a side view of a conveyer constructed according to this invention. Fig. 2 is a plan view of the same. Fig. 3 is a detail end view of one pair of conveyer jaws. Fig. 4 is a face view of one spring-pressed conveyer jaw, showing the supporting crossbar in section on the line 4—4 in Fig. 3.

The transfer mechanism with its conveyer is mounted on the main frame 10 of the cane harvesting machine, and the cut canes are carried rearwardly in the machine, while vertical, between a pair of horizontal endless travelling devices 12, portions only of which are shown as they do not form a part of the present invention.

The conveyer has a front and lower shaft 16 which is journaled in bearings 17 carried by the main frame 10, and it has a rear and upper shaft 18 journaled in bearings 19 also supported by the main frame 10. Sprocket chain wheels 20 are secured on these shafts 16 and 18, and are provided with a pair of endless conveyer chains 21, suitably spaced apart. The rear shaft 18 is preferably the driving shaft, and is driven by a sprocket wheel 24 from any suitable motor. Upper guide sheaves 26 are provided in front of the shaft 18, so that the rear parts of the upper stretches of the conveyer chains 21 are supported in a substantially horizontal position, and the front and middle parts of the said stretches are supported in an upwardly and rearwardly inclined position. The guide sheaves 26 are mounted on a shaft 27, and are supported by the main frame 10. Lower guide sheaves 28 are provided below the driving shaft 18, so as to support the rear parts of the lower stretches of the conveyer chains 21 in a substantially vertical position, and these sheaves are mounted on a shaft 29 supported by the main frame 10.

The conveyer chains 21 are of any approved construction, and back rests or supports 31 are secured to the main frame 10 by brackets 31', and are arranged under the inclined portions of the upper stretches of the conveyer chains 21 to prevent them from sagging.

Two similar devices for gripping the canes are preferably provided, and are shown one at the front end and the other at the rear end of the conveyer chains, and as they are both alike the description will be confined to one of them. A crossbar 32 is secured between the two conveyer chains 21, and two opposed jaws 33 are slidable longitudinally on the crossbar 32, which is rectangular in cross-section so that the jaws 33 cannot rotate upon it. Each jaw 33 has two arms 34 which are spaced apart, and which project one in front of the other from the ends of its main portion. Each arm 34 has a series of guide chambers 35 formed in it, and 36 are plungers which are slidable in the chambers 35. Springs 37 are arranged in the chambers 35, and project the plungers outwardly towards the center line of the machine. The plungers have stems 38 which project through holes in the bottoms of the chambers, and are provided with nuts 39 to prevent the plungers from being pressed forwardly by the springs to an undesirable extent. These spring-pressed plungers grip the canes firmly without injuring them.

The two jaws 33 of the pair of opposed jaws are slid toward each other on the crossbar 32 by means of springs 40. Each jaw has two springs 40, and each spring is secured to a lug 40' on the jaw to which it pertains at one end, and has its other end secured to a lug or bracket 41 which projects from the crossbar 32. These springs are arranged on the other side of the crossbar 32 from the arms 34, so that they do not obstruct the canes which are gripped between the opposed spring-pressed plungers 36. A roller 42 is mounted on a pin 43, and is carried by the main portion of each jaw, and is preferably arranged in a pocket 44 between the springs 40.

These rollers 42 are adapted to run against two tracks or track bars 45, portions of which are shown in Fig. 3. These tracks are supported from the main frame 10 by any suitable brackets 46, and they are arranged between the lower stretches of the conveyer chains 21. The tracks 45 are arranged parallel to each other for the greater part of their length, and their top end portions 47 are curved and are inclined towards each other as shown in Fig. 2. The bottom end portions of the tracks are parallel to each other, and they are curved to conform to the curvature of the conveyer chains while passing around the front chain wheels.

The opposed jaws of each gripping device are held apart by the rollers 42 and the tracks 45 while travelling with the lower stretches of the drive chains. When the rollers leave the tracks at their front ends the arms 34 project horizontally, and the vertical cane or canes placed between them by the devices 12 are gripped between the spring-pressed plungers 36, the said arms being slid towards each other on their supporting crossbar by their closing springs 40. The canes thus gripped by the jaws are carried up by the upper stretches of the conveyer chains, and are tilted over to a horizontal position. When the rollers 42 meet the inclined diverging portions 47 of the tracks they are forced apart, so that the canes are released, and are discharged onto a suitable support or chute 50, a portion only of which is shown as it does not form a part of the present invention. The conveyer is operated continuously as the harvesting machine is moved over the field to cut down the canes, and it operates to tilt over the cut canes, and carry them rearwardly and raise them to a predetermined level, and discharge them onto the support or chute, whence they are distributed to the stripping devices.

What I claim is:

1. In a conveyer, a frame, front and rear shafts journaled in the frame and provided with chain wheels, a pair of endless conveyer chains carried by the chain wheels, a crossbar secured between the conveyer chains, spring-pressed gripping jaws slidable on the said crossbar, said jaws being adapted to grip a plurality of canes, and each jaw comprising a main portion mounted to slide on the crossbar and having gripping arms for the canes projecting laterally from it and arranged one in front of the other, and means which separate the jaws automatically as they pass the rear shaft and permit the jaws to move toward each other as they pass the front shaft.

2. A conveyer as set forth in claim 1, the means for operating the jaws comprising parallel track bars secured to the frame and arranged between the conveyer chains and having diverging inclined portions at their rear parts which are curved around the said rear shaft and which operate to slide the opposed jaws outwardly on the said crossbar to discharge the canes at the rear end of the conveyer.

3. A conveyer as set forth in claim 1, the means for operating the jaws comprising parallel track bars secured to the frame and arranged between the return stretches of the conveyer chains, said track bars having parallel and curved front end portions arranged concentric with and below the front shaft, said front end portions operating to hold the jaws apart until their said gripping arms are substantially horizontal and projecting forwardly, and having diverging and curved rear end portions arranged concentric with and above the rear shaft to thrust the opposed jaws apart.

4. In a conveyer, a pair of endless conveyer chains, a crossbar secured between the said chains, a pair of opposed jaws slidable on the crossbar, springs moving the jaws towards each other to grip the canes automatically, and a stationary device which thrusts the jaws apart to release the canes at the delivery end of the conveyer.

5. In a conveyer, a pair of endless conveyer chains, a crossbar secured between the said chains, a pair of opposed jaws slidable on the crossbar and each having two arms arranged one behind the other and adapted to engage the canes, springs moving the said jaws towards each other to grip the canes at the receiving end of the conveyer, and a stationary device which thrusts the jaws apart to release the canes at the delivery end of the conveyer.

6. A conveyer as set forth in claim 5, the said arms being each provided with yielding spring devices at their opposed sides for engaging with the canes.

7. A conveyer as set forth in claim 5, the said arms being each provided with a series of chambers, and spring-pressed plungers for engaging the canes slidable in the said chambers.

8. A conveyer as set forth in claim 5, the said stationary device comprising track bars arranged between the conveyer chains and provided with diverging portions at the delivery end of the conveyer, and the said jaws being provided with rollers which run on the said track bars.

9. In a conveyer, a pair of endless conveyer chains, a crossbar secured between the chains, a pair of opposed jaws slidable on the crossbar and each having two arms arranged one behind the other and adapted to engage the canes, springs secured at one end to the jaws and at the other end to the crossbar and being arranged on the other side of the crossbar from the arms, rollers carried by the jaws and arranged between the said springs, and a stationary device which engages the rollers and thrusts the jaws apart to release the canes at the delivery end of the conveyer.

10. In a conveyer, a pair of endless conveyer chains, a crossbar secured between the chains, a pair of opposed jaws adapted to grip a plurality of canes, each jaw comprising a main portion slidable upon the crossbar and having laterally projecting gripping arms arranged one in front of the other, and a spring device which normally holds the jaws in a position to grip the canes between the arms of the pair of jaws.

In testimony whereof I have affixed my signature.

HENRY OSBERT SCRANTON.